: US 10,270,783 B2
(45) Date of Patent: Apr. 23, 2019

(54) METHOD FOR SECURE CONFIGURATION AND USE OF A SYSTEM FOR MONITORING AND/OR CONTROLLING MODULES

(71) Applicant: Schneider Electric Industries SAS, Rueil-Malmaison (FR)

(72) Inventors: Roland Goutay, Saint Nazaire les Eymes (FR); Philippe Canton, Varces Allieres et Risset (FR); Yann Golaz, Montbonnot Saint Martin (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 100 days.

(21) Appl. No.: 15/220,640

(22) Filed: Jul. 27, 2016

(65) Prior Publication Data

US 2017/0093880 A1 Mar. 30, 2017

(30) Foreign Application Priority Data

Sep. 30, 2015 (FR) ...................................... 15 59229

(51) Int. Cl.
*H04L 29/06* (2006.01)
*H04W 12/04* (2009.01)

(52) U.S. Cl.
CPC .......... *H04L 63/107* (2013.01); *H04L 63/123* (2013.01); *H04W 12/04* (2013.01); *H04B 2203/5433* (2013.01)

(58) Field of Classification Search
CPC ............................. H04L 63/107; H04L 63/123
USPC .......................................................... 726/4
See application file for complete search history.

(56) References Cited

U.S. PATENT DOCUMENTS

| 8,813,179 | B1* | 8/2014 | Qureshi | H04L 63/20 726/1 |
|---|---|---|---|---|
| 9,009,805 | B1 | 4/2015 | Kirkby et al. | |
| 9,082,018 | B1 | 7/2015 | Laska et al. | |
| 9,170,707 | B1 | 10/2015 | Laska et al. | |
| 2003/0220867 | A1* | 11/2003 | Goodwin | G06Q 30/08 705/37 |
| 2004/0117635 | A1* | 6/2004 | Karaoguz | H04L 63/083 713/182 |

(Continued)

FOREIGN PATENT DOCUMENTS

FR 2 984 051 6/2013

OTHER PUBLICATIONS

French Preliminary Search Report dated May 24, 2016 in French Application 15 59229 filed on Sep. 30, 2015 ( With English Translation of categories of Cited Documents).

*Primary Examiner* — Matthew T Henning
(74) *Attorney, Agent, or Firm* — Oblon, McClelland, Maier & Neustadt, L.L.P.

(57) ABSTRACT

Monitoring and controlling modules of a system includes obtaining, with a portable piece of equipment associated with an installation operator, an identifier that encodes a physical network address of a communicating module, and obtaining, with the portable piece of equipment, an installation geolocation information item. The physical network address and the installation geolocation are transmitted to a central server by the portable piece of equipment, and the central server verifies prior storage of said physical network address. If the physical network address cannot be verified, the server stores the physical network address in association with the identifier.

14 Claims, 3 Drawing Sheets

(56) References Cited

U.S. PATENT DOCUMENTS

| | | |
|---|---|---|
| 2011/0007901 A1 | 1/2011 | Ikeda et al. |
| 2011/0029385 A1* | 2/2011 | Engel .................... G06Q 30/02 705/14.53 |
| 2013/0223279 A1 | 8/2013 | Tinnakornsrisuphap et al. |
| 2013/0289752 A1* | 10/2013 | Orsat .................... G08C 17/02 700/90 |
| 2014/0105397 A1 | 4/2014 | Ikeda et al. |
| 2015/0327304 A1 | 11/2015 | Tinnakornsrisuphap et al. |
| 2016/0004390 A1 | 1/2016 | Laska et al. |
| 2016/0092044 A1 | 3/2016 | Laska et al. |
| 2016/0092737 A1 | 3/2016 | Laska et al. |
| 2016/0092738 A1 | 3/2016 | Laska et al. |
| 2016/0093336 A1 | 3/2016 | Laska et al. |
| 2016/0093338 A1 | 3/2016 | Laska et al. |
| 2016/0094994 A1 | 3/2016 | Kirkby et al. |
| 2016/0211985 A1* | 7/2016 | Castillo ................ F24F 11/006 |

* cited by examiner

METHOD FOR SECURE CONFIGURATION AND USE OF A SYSTEM FOR MONITORING AND/OR CONTROLLING MODULES

The invention concerns a method for secure configuration of a system of modules for monitoring and/or controlling pieces of domestic, industrial or office equipment, the system comprising a communicating module. It also concerns an associated method for secure use of such a system of modules, and associated devices.

It resides in the field of providing security for configuration and installation of systems of monitoring and/or control modules.

One problem is posed in particular to the secure configuration of modules to be installed on sites under construction.

The reason is that the construction of buildings or accommodation involves various installations being set up, for example electric cables, installations for drinking water, gas and heating. In the domestic sector, for example, a building is equipped with such installations for construction, and individual accommodations are equipped with consumption meters per accommodation.

There are programmable devices having communication capabilities that allow the final user to manage and control the various pieces of equipment, by direct or remote control. By way of example, a communicating module can be installed that is able to receive consumption information items from various pieces of equipment by wired links or local radio links and an associated communication protocol, and to communicate these consumption information items to a central server using another communication mode.

By way of example, Schneider Electric markets such an assembly or system of modules that allows energy consumption to be monitored and controlled. This system of modules has communication capabilities, via a communicating module using the IP (Internet Protocol) communication protocol.

The installation of such a system of modules and initial configuration thereof for launch require intervention of a specialist installation operator. The reason is that configuration comprises the setup and pairing of radio receiver modules with transmitters associated with the local equipment or installations, in a domestic, industrial or office context, according to the communication protocol of these transmitters for example.

When installation takes place at the time of construction of a building, the installation, configuration and recording of such a system of modules comprising a communicating module able to communicate via the Internet poses a problem when access to the Internet network and/or electrical connection are not available on the building site.

Moreover, construction sites are open spaces that are often unguarded, and therefore numerous thefts of hardware take place on building sites.

There is a need to facilitate the installation and configuration of a system of modules comprising a communicating module, for example on a construction site or on any site lacking network access and/or lacking electrical connection, while providing an improvement in security in relation to the installation or the possible use of stolen hardware.

The invention falls more particularly within the scope of this context and has the aim of proposing a method for secure configuration of a system of modules having communication capabilities.

To this end, the invention proposes, according to a first aspect, a method for secure configuration of a system of modules for monitoring and/or controlling pieces of domestic, industrial or office equipment, the system comprising a communicating module, able to receive items of monitoring and control information from the other modules of the system and to communicate the information items received to a central server via a first communication mode.

This method has steps of:
  obtaining, with a portable piece of equipment associated with an installation operator, an identifier able to encode information items containing a physical network address of the communicating module,
  obtaining, with the portable piece of equipment, an installation geolocation information item,
  transmitting an information item containing said physical network address to said central server with said portable piece of equipment via a second communication mode;
  transmitting, with said portable piece of equipment, to the central server, via the second communication mode, the installation geolocation information item,
  verifying, with the central server, prior storage of said physical network address,
  in the event of negative verification, authorizing configuration of said system of modules and recording, in a memory of the central server, said physical network address in association with an identification information item for the installation operator and with said received installation geolocation information.

Advantageously, the implemented method of the invention allows a configuration to be performed via a portable piece of equipment and allows storage, for a communicating module, of an associated physical network address, an identification information item for the installation operator and a geolocation information item, thus allowing the provision of strengthened security, including when the system of modules having the communicating modules is installed when at least some of these modules are not yet supplied with power and when access to the communication network is not available.

The method for secure configuration according to the invention can also have one or more of the features below, taken independently or in all technically acceptable combinations.

It comprises, prior to the step of obtaining an identifier, a step of obtaining an identification information item for the installation operator, comprising at least one e-mail address of the installation operator.

According to one variant, in the event of positive verification, the method involves blocking the configuration of the system of modules and sending a notification containing said received installation geolocation information item to the installation operator identified by the installation operator identification information item stored in association with said physical network address.

It moreover involves extracting an initial geolocation information item recorded in said memory of the central server in association with said physical network address and sending the initial geolocation information item to the identified installation operator.

The method has a step of receiving an unblocking authorization or denial sent by said installation operator.

According to another variant, in the event of positive verification, the method involves extracting an initial geolocation information item recorded in said memory of the central server in association with said physical network address, and blocking the configuration of the system of modules when said initial geolocation information item differs substantially from the received installation geolocation information item, to within a predetermined tolerance level.

The identifier encodes binary information items, and the method has a step of reading the identifier and extracting a physical network address from the encoded binary information items.

The identifier moreover has information items relating to the modules of the system of modules.

According to another aspect, the invention concerns a method for secure configuration of a system of modules for monitoring and/or controlling pieces of domestic, industrial or office equipment, the system of modules comprising a communicating module, able to receive items of monitoring and control information from the other modules of the system and to communicate the information items received to a central server via a first communication mode.

This method comprises for putting the system of modules to use, steps of:
- obtaining, with a portable piece of equipment associated with the final user, the physical network address of the communicating module and transmitting said physical network address to said central server;
- verifying, with the central server, prior storage of said physical network address,
- and in the event of the physical network address being present, authorizing or prohibiting use of the system of modules depending on a configuration state associated with said physical network address.

According to one embodiment, the method for secure use moreover has steps of:
- obtaining a use geolocation information item for the communicating module and transmitting to the central server, with said portable piece of equipment associated with the final user, the use geolocation information item, and, following verification of the presence of the physical network address in a memory of the server,
- extracting an initial geolocation information item recorded in said memory of the central server in association with said physical network address and verifying agreement between the recorded initial geolocation information item and the received use geolocation information item.

According to one embodiment, in the absence of agreement, the method for use has a step of blocking the use of the system of modules.

According to one embodiment, in the absence of agreement, the method for use has steps of:
- sending a notification containing said received use geolocation information item and the recorded initial geolocation information item to the installation operator identified by an installation operator identification information item stored in association with said physical network address,
- receiving an authorization or a prohibition for unblocking of the use of the system of modules, sent by said installation operator.

According to another aspect, the invention concerns a device for secure configuration of a system of modules for monitoring and/or controlling pieces of domestic, industrial or office equipment, comprising said system of modules and a central server, said system of modules comprising a communicating module, able to receive monitoring and control information items from the other modules of the system of modules and to communicate the information items received to the central server via a first communication mode. The configuration device has:
- a portable piece of equipment associated with an installation operator, suited to:
  - obtaining an identifier able to encode information items containing a physical network address of the communicating module,
  - obtaining an installation geolocation information item,
  - transmitting, via a second communication mode, an information item containing said physical network address to said central server;
  - transmitting, via the second communication mode, to the central server, the installation geolocation information item,
- the central server being suited to verifying prior storage of said physical network address, and, in the event of negative verification, to authorizing the configuration of said system of modules and to recording, in a memory of the central server, said physical network address in association with an identification information item for the installation operator and with said installation geolocation information item.

According to another aspect, the invention concerns a device for secure use of a system of modules for monitoring and/or controlling pieces of domestic, industrial or office equipment, comprising said system of modules and a central server, said system of modules comprising a communicating module, able to receive monitoring and control information items from the other modules of the system and to communicate the received information items to the central server via a first communication mode. This device comprises, for putting the system of modules to use:
- a portable piece of equipment associated with the final user, suited to obtaining the physical network address of the communicating module and to transmitting said physical network address to said central server,
- the central server being suited to verifying prior storage of said physical network address,
- and in the event of the physical network address being present, the server being suited to authorizing or prohibiting the use of the system of modules depending on a configuration state associated with said physical network address.

According to another aspect, the invention concerns a computer program having instructions for implementing the steps of a method for secure configuration of a system of modules for monitoring and/or controlling pieces of domestic, industrial or office equipment as briefly described above when the program is executed by a processor of a programmable device.

According to another aspect, the invention concerns a computer program having instructions for implementing the steps of a method for secure use of a system of modules for monitoring and/or controlling pieces of domestic, industrial or office equipment as briefly described above when the program is executed by a processor of a programmable device.

Other features and advantages of the invention will emerge from the description provided therefor below, by way of indication and without in any way implying limitation, with reference to the appended figures, among which:

FIG. 1 schematically shows a system in which the configuration method according to the invention can be used;

Figure 1:
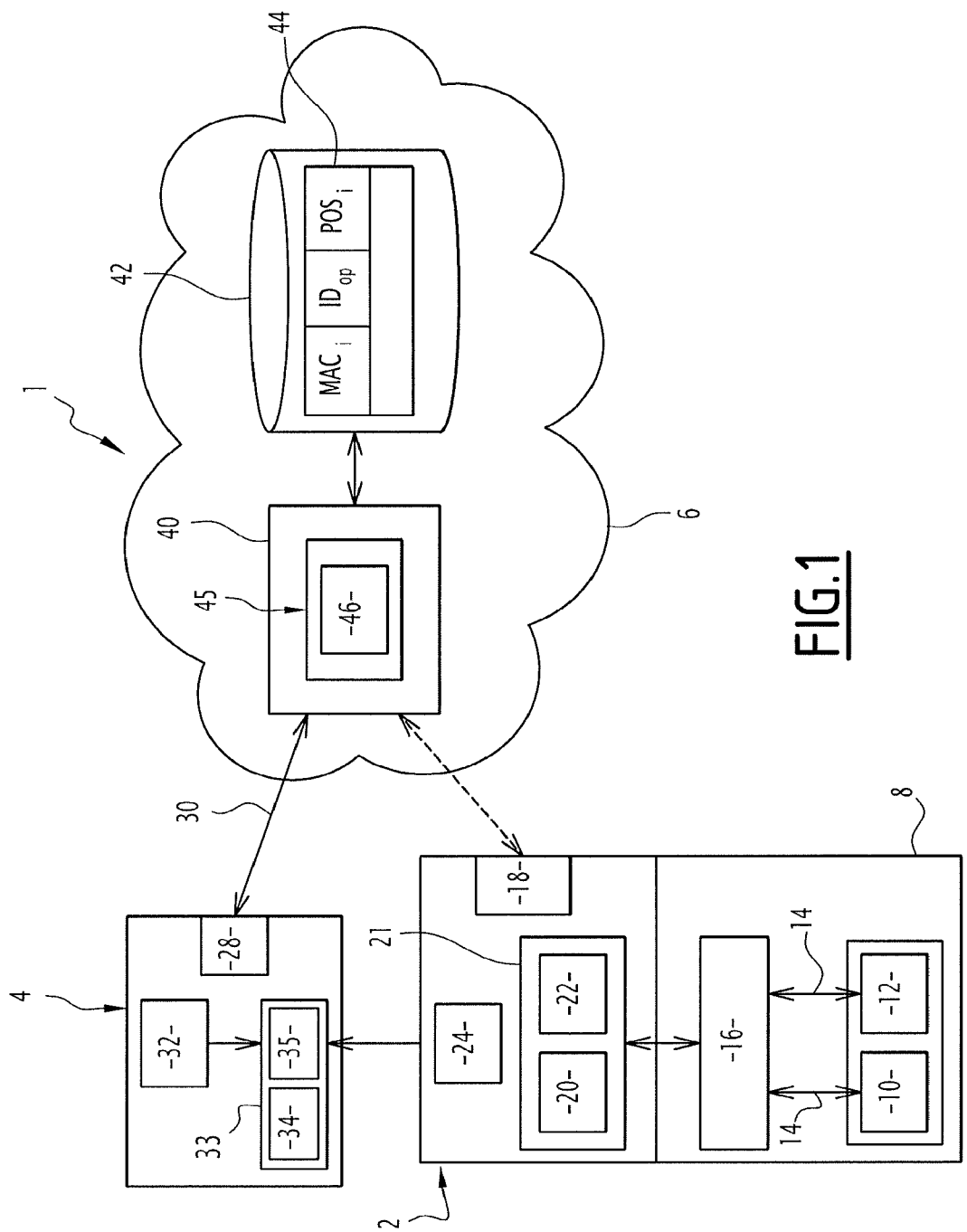

FIG. 1 schematically shows a configuration system 1 in which the invention can be used.

The system 1 comprises a system of modules 8 for monitoring and/or controlling pieces of domestic or industrial equipment such as power consumption meters, for example.

In one implementation of the invention, the system of modules 8 is to be installed in a building that is not shown, for example on a construction site.

The system of modules 8 has a communicating module 2 having network communication capabilities for connecting to the internet network 6, according to a first communication mode.

The system 1 moreover has a portable piece of equipment 4, associated with an installation operator in the installation/configuration phase and associated with a final user in the use phase, which has communication capabilities via a second communication mode, implementing a mobile telephony network, for example, according to the 3G or LTE protocol, as explained in more detail below, in order to make a connection to the internet network 6.

The system moreover has modules 10, 12 for receiving/transmitting monitoring and control information items, each of these modules being able to communicate with one or more pieces of equipment.

The products or modules making up the system of modules 8 have radio communication means 16, able to communicate according to a third communication mode implementing a predetermined radio communication protocol, for example, Zigbee, Wifi, Bluetooth, WM-Bus (for "Wireless Meter Bus"), with the modules for transmitting/receiving information 10, 12.

The radio communication links according to this third communication mode are denoted by 14.

For example, the situation relates to metering and control of consumption of electricity, gas and water, and the modules 10, 12 are thus able to transmit consumption information items to a remote server, via the communicating module 2, and to receive configuration and control data.

In one embodiment, one of the modules 10, 12 receives information items from a fuse box (not shown) of the installation under consideration.

It should be noted that the various modules forming part of the system of modules 8 can be implemented in a single device or in separate devices that are able to communicate among one another by wired means or by radio means.

The communicating module 2 has a communication module 18 that uses a communication network, for example a wireless WiFi communication network or an Ethernet port, allowing connection to the network 6.

Thus, the communicating module 2 serves as a network gateway to the system 8 of monitoring and/or control modules.

The communicating module 2 also comprises a computation unit 21 comprising at least one processor, able to implement a software application 20, which has program code instructions allowing execution of the steps of a configuration method according to the invention, and a software application 22, which will not be described in more detail here, that implements application operation of the communication module 2.

For example, the software application 22 implements a method for managing and controlling power consumption.

Moreover, the communicating module 2 has an identifier 24 able to encode information items, for example of QR code type, which, in one embodiment, is formed by a matrix of black and white pixels, for example corresponding to binary information items 0 and 1. The arrangement of the black and white pixels allows encoding of a string of binary data that is interpretable by an appropriate reader.

Alternatively, the identifier 24 is a Datamatrix code or a bar code, which are readable by an appropriate reader.

In one embodiment, such an identifier 24 is a graphical identifier printed or etched on the casing of the communicating module 2.

Alternatively, the information items encoded by the identifier 24 are stored in a memory of the communicating module 2 and accessible via a radio, for example Bluetooth or Wifi, communication means.

According to another alternative, the identifier 24 is encoded in a radio identification (RFID) tag.

Advantageously, the identifier 24 encodes a unique identifier associated with the communicating module 2, which is preferably a physical network address, or MAC (Media Access Control) address, which will be used for network communications in the physical layer.

According to one variant, the identifier 24 encodes, in addition to the physical network address, information items relating to the other modules of the system of modules 8.

The portable piece of equipment 4 is able to capture the identifier 24 for example by using an integrated camera or another appropriate reader.

This portable piece of equipment 4 is preferably a programmable device such as a portable computer, a portable telephone or a tablet, equipped in a known manner with a computation processor, with a man/machine interface, with image capture means (e.g. a camera) or barcode reading means, and with a module for communication 28 via a mobile telephony network, for example according to the 3G or LTE protocol, allowing communications 30 to be sent and received. Optionally, the portable piece of equipment 4 is equipped with a radio, for example Bluetooth, Wifi or NFC, communication means, which particularly allows reading of the information items stored in a memory of the communicating module 2 in one embodiment.

Advantageously, the portable piece of equipment 4 allows connection to the network 6 in the absence of access by the dedicated means on the site under consideration, and in the absence of a power supply for the modules of the system of modules 8.

Thus, the portable piece of equipment 4 allows access to the internet network on a building site prior to the installation of cables or wireless access points for the communication network 6, and therefore before having the option of recording the communicating module 2 and the system of modules 8 for subsequent use.

The portable piece of equipment 4 is also fitted with a satellite geolocation module, or GPS module, referenced 32, that is able to compute and to dynamically update the geolocation position of the portable piece of equipment 4. As a variant or additionally, the portable piece of equipment 4 is able to obtain a geolocation position via a connection to a Wifi or 3G beacon.

The portable piece of equipment 4 has a computation unit 33 having a processor, able to implement software applications 34, 35, having program code instructions allowing execution of the steps of the configuration method according to the invention.

When the communicating module 2 is configured, the application 34 of the portable piece of equipment sends to a central server 40 a message containing the MAC address of the communicating module 2, denoted $MAC_i$, and an identification information item $ID_{OP}$ for the installation operator.

The identification information item $ID_{OP}$ allows the installation operator to be identified and to be contacted, and comprises an identifier of connection name (or login) type and/or an email or telephone address, for example, allowing the operator to be reached subsequently. In one embodiment, the identification information item $ID_{OP}$ comprises only an email address for the installation operator.

Moreover, the application 34 also sends the geolocation information item $POS_i$ for the portable piece of equipment 4, which is retrieved substantially at the same time as capture of the identifier 24 of the communicating module 2 is effected.

Thus, the geolocation information item $POS_i$ of the portable piece of equipment 4 is representative of the geolocation position of the communicating module 2 when it is installed.

The central server 40 is connected to or comprises a storage unit 42, able to store the received information items in a database 44.

As a variant, the received information items are stored in registers or in separate files.

The server 40 also has computation processors 45, able to implement a software application 46, which has program code instructions allowing execution of the steps of the configuration method according to the invention.

The software application 35 is intended for the final user, in a use phase for controlling and monitoring the system of modules 8 by using information items received from the server 40. The server 40 uses the monitoring information items transmitted by the communication module 2 in a use phase.

Figure 2:
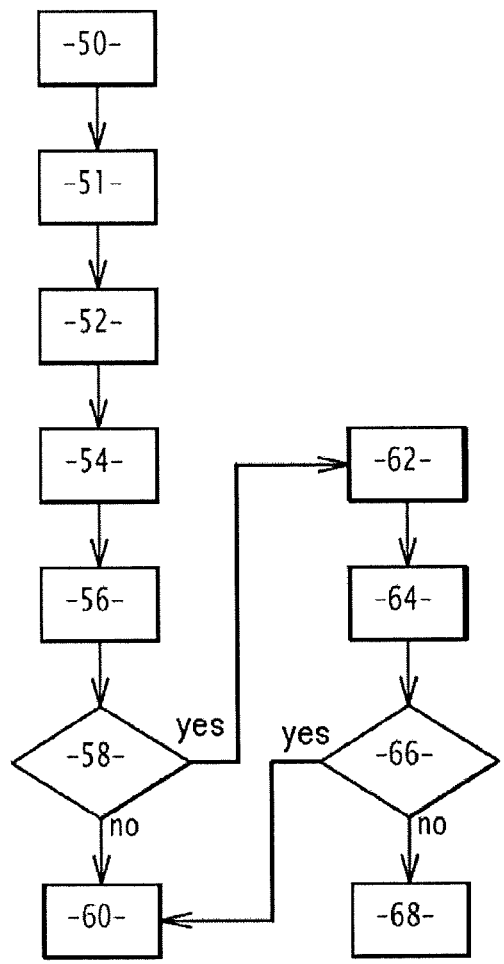
FIG. 2 is an overview of the main steps of a method for secure configuration of a communicating module according to an embodiment.

FIG. 2 is an overview of the main steps of a method for secure configuration of a communicating module according to an implementation of the invention.

The steps of this method are implemented by each of the software applications 34 and 46, as explained in more detail below.

In a first step 50, the installation operator identifies himself on the software application 34, by providing one or more identification information items $ID_{OP}$ via a graphical interface of the portable piece of equipment 4.

Next, in a step 51, the operator captures, using this portable piece of equipment 4, an identifier $QR_1$ on the communicating module 2 to be installed. As a variant, the identifier 24 is input manually by the operator in a field of the software application 34.

Substantially in parallel or successively, a geolocation information item of the portable piece of equipment 4, also called installation geolocation information item and denoted $POS_1$, is obtained automatically or manually in step 52 by the portable piece of equipment 4.

The software application 34 associates the identification information item for the installation operator, $ID_{OP}$, and the identifier $QR_1$ and the geolocation information item $POS_1$ in step 54.

Moreover, in this step 54, the physical network address $MAC_1$ of the communication module is extracted from the identifier $QR_1$.

Next, in a communication step 56, the software application 34 sets up a communication with the server 40 via the second communication mode.

In this communication step, the collected information items, comprising the identification information item for the installation operator $ID_{OP}$, the physical network address $MAC_1$ of the communicating module and the geolocation information item $POS_1$ are sent to the server.

As a variant, the identifier $QR_1$ is sent to the server, stored in the database 44 and the physical network address $MAC_1$ is obtained by the software application 46 implemented by the server 40.

In one embodiment, the communication step 56 comprises a first connection step in which identification information items from the installation operator are communicated and a second step of sending messages containing the other information items.

The server 40 implements, with the software application 46, a step 58 for verifying the presence of the physical network address $MAC_1$ in the database 44, previously stored.

In the event of negative verification in step 58, it is inferred from this that the communication module 2 is actually being installed for the first time. By way of assumption, it is inferred from this that there is no security risk, and use of the hardware is considered to be legal.

In this case, step 58 is followed by a step 60 for recording the information items $MAC_1$, $ID_{OP}$ and $POS_1$ in the database 44, and all the operations to follow for configuration of the system of monitoring and/or control modules are authorized.

For example, a configuration/use authorization indicator is stored on the server.

The configuration operations comprise the recording, by the server 40, of parameters for local configuration of the system of modules 8.

For example, these are parameters for local configuration such as the radio transmitter/receiver pairing address and the description of the modules of the system of modules 8 and of their main features.

In a practical example, for association with a water meter, the pulse weight in liters/pulse, or the type of each input/output of the system, are configured.

These parameters are downloaded by the system of modules 8, via the communicating module 2, when it is first connected to the server 40, if the communicating module 2 has not been powered up at the time of installation.

The configuration process is therefore completed by saving all of the parameters for configuration of the system of modules 8 on the server 40, stating that configuration is finished, with a view to subsequent reuse, when the communicating module 2 is powered up and its connection to the network is activated.

As a variant, when the identifier 24 has information items relating to the modules of the system of modules 8, in addition to the physical network address, some of the operations of the configuration process are performed between the portable piece of equipment 4 and the server 40.

In the event of positive verification in step 58, so if the physical network address $MAC_1$, which is a unique identifier for the communicating module 2, is already present in the memory 42 of the server, in association with an identification information item of the operator $ID_{OP\text{-}init}$ and a geolocation position $POS_{init}$, it is inferred therefrom that there is a possible risk of illegal use. The hardware may have been moved, and possibly stolen for illegal use.

In this case, step 58 is followed by a step 62 for blocking configuration and denying recording.

For example, in practice, the server 40 identifies this address as prohibited for access and interrupts the configuration process of the application 34, and denies all access to data stored in the memory 42 of the server, along with recording of any final user of the system of modules 8, rendering this system unusable remotely.

For example, a configuration/use prohibition indicator is stored on the server.

Likewise, the transfer of configuration parameters from the database 44 to the communicating module 2 of the system of modules 8 is blocked, rendering the system of modules 8 unusable.

Thus, the aim of this blocking is to block any use and any configuration of a stolen communicating module to begin with.

Next, in a step 64, the operator identification information item $ID_{OP\text{-}init}$ stored in the database 44 in association with the physical network address $MAC_1$ is retrieved, along with the position $POS_{init}$ (first position recorded in the database 44) and a notification is sent to the initial installation operator to authorize new geolocation of the communicating module 2.

The initial installation operator receives this notification and accepts or does not accept the unblocking of the configuration of the communicating module via the software application 46, depending on the positions $POS_1$ and $POS_{init}$.

The method thus allows validation of any deliberate change of location of the communicating module 2 and of the associated system of modules 8 by the initial installation operator.

Indeed, in some application scenarios, the initial installation operator has himself been able to move a communicating module, or installation and configuration can be carried out, in an anticipated manner, at a time subsequent to the time of initial recording and by another installation operator. In this case, there is provision for unblocking to be accepted.

There is thus verification, by the server 40, in a verification step 66, of whether or not the initial installation operator accepts unblocking.

In the event of acceptance, step 66 is followed by step 60 described above.

In the event of denial, step 66 is followed by a step 68 in which an illegal use report is transmitted with the received geolocation information items $POS_1$ and $POS_{\text{-}init}$. This type of report can be used to find stolen hardware, for example. The server 40 stores the illegal use information item and prohibits any configuration or subsequent use of the system of modules 8.

As a variant, as soon as the positions $POS_{init}$ and $POS_1$ differ to within a given tolerance level, blocking is imposed.

Figure 3:
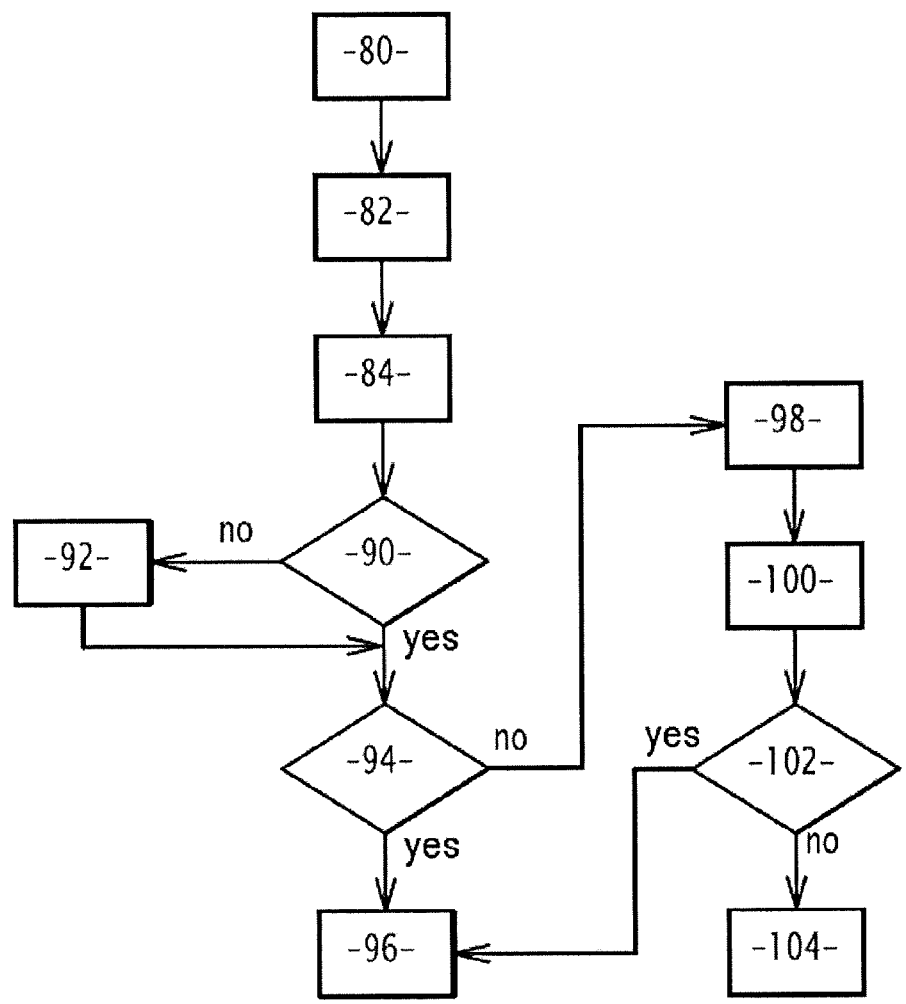
FIG. 3 is an overview of the main steps of a method for secure use of a communicating module according to an embodiment.

FIG. 3 is an overview of the main steps of a method for using a communicating module according to an implementation of the invention.

It involves the use of the communicating module 2 by a final user, following installation and configuration.

The steps of this method are implemented by each of the software applications 20, 35 and 46, as explained in more detail below.

In a first step 80, the final user discloses the unique network address of the communicating system that he wishes to set up for nominal use, either by capturing, with his portable piece of equipment 4, an identifier $QR_2$ on the communicating module 2 or by means of manual input.

Substantially in parallel or successively, a geolocation information item of the portable piece of equipment 4, denoted by $POS_2$ and called use geolocation information item, is obtained in step 82 by the portable piece of equipment 4. As a variant, the geolocation information item is obtained by 3G or by location via the IP address of the portable piece of equipment.

Preferably, to improve security, manual input of a geolocation information item $POS_2$ by the final user is not authorized.

Step 82 is followed by a step 84 comprising extraction of the physical network address $MAC_2$ of the communication module from the identifier $QR_2$, and sending of the use geolocation information item $POS_2$ and the address $MAC_2$ to the server 40.

A step 90 of verification of the configuration state is implemented.

This step 90 involves verification of whether the server has, in a memory unit 42, the set of configuration parameters that are useful for configuring the modules 2, 10, 12 of the system of modules 8. The set of configuration parameters will be able to be downloaded afterwards.

In the event of negative verification, step 90 is followed by a step 92 recommending that the final user speak to an installation operator, typically an electrician, in order to configure the communicating module.

In the event of positive verification, step 90 is followed by a step 94 for verifying the geolocation information items, which is implemented by the server 40.

In this step, the server extracts the initial geolocation information item $POS_{2\text{-}init}$, stored in association with the address $MAC_2$, which is compared with the use geolocation information item $POS_2$, from the stored database 44.

If these geolocation information items are identical or substantially identical to within a predetermined tolerance level, then step 94 is followed by a step 96 in which the communicating module 2 is put into operation, the address $MAC_2$ being used for network communications on the physical layer. The software application 20 allows download of the control information items relating to the modules of the system of communicating modules, particularly the configuration parameters, and transmission of monitoring information items to the server.

In the event of negative verification in step 94, this step is followed by a step 98 for blocking use of the communicating module 2, and therefore of the system of modules 8.

It should be noted that there is also provision for use of this communicating module 2 to be blocked if, at any time, the identified installation operator reports the absence of the communicating module 2 on the installation site, because this implies a suspicion that the hardware has been stolen.

Step 98 is followed by a step 100 in which the identification information item of the initial installation operator $ID_{OP\text{-}init}$ stored in association with the physical network address $MAC_2$ is retrieved, and a notification is sent to the initial installation operator.

This notification comprises the physical network address $MAC_2$ and the use geolocation information item $POS_2$, along with the position $POS_{2\text{-}init}$ (first position recorded in the database 44 in relation to the physical network address $MAC_2$).

The initial installation operator receives this notification and accepts or does not accept unblocking for use of the communicating module depending on the positions $POS_2$ and $POS_{init}$.

There is thus verification, by the server 40, in a verification step 102, of whether or not the initial installation operator accepts unblocking.

In the event of acceptance, step 102 is followed by step 96 described above.

In the event of denial, step 102 is followed by a step 104 in which an illegal use report is transmitted with the received geolocation information item $POS_2$. This type of report can be used to find stolen hardware, for example.

The blocking of use of the communicating module is maintained.

The invention has been described in embodiments.

Thus, advantageously, the invention allows blocking of the configuration and/or use of a system of control and/or monitoring modules having a communicating module by virtue of the implementation of an identifier of the communicating module, in association with geolocation information items and with installation operator identification information items. By virtue of the invention, the stolen hardware cannot be put back into operation.

The invention claimed is:

1. A method for secure configuration of a system of modules for monitoring and controlling pieces of domestic, industrial or office equipment, the system comprising a communicating module to receive items of monitoring and control information from other modules of the system and to communicate the items of monitoring and control information received to a central server via a first communication mode, the method comprising:
- obtaining, with a portable piece of equipment associated with an installation operator, an identifier that encodes at least a physical network address of the communicating module,
- obtaining, with the portable piece of equipment, an installation geolocation information item,
- transmitting, by the portable piece of equipment, an information item containing said physical network address to said central server via a second communication mode;
- transmitting, with said portable piece of equipment, to the central server, via the second communication mode, the installation geolocation information item,
- verifying, with the central server, prior storage of said physical network address, and
- in the event of negative verification, authorizing configuration of said system of modules and recording, in a memory of the central server, said physical network address in association with an identification information item for the installation operator and with said received installation geolocation information item; and
- in the event of a positive verification:
  - blocking configuration of the system of modules to deny the system of modules access to the central server, and
  - sending a notification containing said received installation geolocation information item to an initial installation operator identified by an installation operator identification information item stored in association with said physical network address in the central server.

2. The method according to claim 1, wherein, prior to the step of obtaining an identifier, a step of obtaining an identification information item for the installation operator, comprising at least one e-mail address of the installation operator.

3. The method according to claim 1, further comprising extracting an initial geolocation information item recorded in said memory of the central server in association with said physical network address and sending the initial geolocation information item to an initial installation operator.

4. The method according to claim 3, wherein a step of receiving an unblocking authorization or denial sent by said initial installation operator.

5. The method according to claim 1, wherein, in the event of the positive verification, the method includes extracting an initial geolocation information item recorded in said memory of the central server in association with said physical network address, and rendering the system of modules unusable from a remote location by blocking the configuration of the system of modules when said initial geolocation information item differs substantially from the received installation geolocation information item, to within a predetermined tolerance level.

6. The method according to claim 1, wherein said identifier encodes binary information items, and in that the method has a step of reading the identifier and extracting a physical network address from the encoded binary information items.

7. The method according to claim 6, wherein the identifier moreover has information items relating to the modules of the system of modules.

8. A non-transitory computer-readable medium encoded with computer-readable instructions that, when executed by a computer, cause the computer to perform the method according to claim 1.

9. A method for secure use of a system of modules for monitoring and controlling pieces of domestic, industrial or office equipment, the system of modules comprising a communicating module to receive items of monitoring and control information from other modules of the system and to communicate the information items received to a central server via a first communication mode, for putting the system of modules to use, the method comprising:
- obtaining, with a portable piece of equipment associated with a final user, a physical network address of the communicating module and transmitting said physical network address to said central server;
- verifying, with the central server, prior storage of said physical network address; and
- in the event of the physical network address being present:
  - blocking configuration of the system of modules to deny the system of modules access to the central server, and
  - sending a notification containing an installation geolocation information item to an initial installation operator identified by an installation operator identification information item stored in association with said physical network address in the central server.

10. The method for secure use of a system according to claim 9, comprising:
- obtaining a use geolocation information item for the communicating module and transmitting to the central server, with said portable piece of equipment associated with the final user, the use geolocation information item,
- following verification of a presence of the physical network address in a memory of the server,
- extracting an initial geolocation information item recorded in said memory of the central server in association with said physical network address and verifying agreement between the recorded initial geolocation information item and the received use geolocation information item.

11. The method for secure use of a system according to claim 10, wherein in the absence of agreement, the method further comprises:
- receiving an authorization or a prohibition for unblocking of the use of the system of modules, sent by said installation operator.

12. A non-transitory computer-readable medium encoded with computer-readable instructions that, when executed by a computer, cause the computer to perform the method according to claim 9.

13. A system for secure configuration of a system of modules for monitoring and controlling pieces of domestic, industrial or office equipment, comprising said system of modules and a central server, said system of modules comprising a communicating module to receive monitoring and control information items from other modules of the system of modules and to communicate the information items received to the central server via a first communication mode, the system comprising:
- a portable piece of equipment associated with an installation operator, configured to:
  - obtain an identifier encoded with a physical network address of the communicating module,
  - obtain an installation geolocation information item,
  - transmit, via a second communication mode, an information item including said physical network address to said central server;
  - transmit, via the second communication mode and to the central server, the installation geolocation information item,
- the central server being configured to:
  - verify prior storage of said physical network address,
  - in the event of negative verification, to authorize the configuration of said system of modules and to recording, in a memory of the central server, said physical network address in association with an identification information item for the installation operator and with said installation geolocation information item, and
  - in the event of a positive verification,
  - block configuration of the system of modules to deny the system of modules access to the central server, and
  - sending a notification containing said received installation geolocation information item to an initial installation operator identified by an installation operator identification information item stored in association with said physical network address in the central server.

14. A system for secure use of a system of modules for monitoring and controlling pieces of domestic, industrial or office equipment, comprising said system of modules and a central server, said system of modules comprising a communicating module receive monitoring and control information items from the other modules of the system of modules and to communicate the received information items to the central server via a first communication mode, for putting the system of modules to use, the system comprising:
- a portable piece of equipment associated with a final user, configured to obtain a physical network address of the communicating module and to transmit said physical network address to said central server,
- the central server being configured to verify prior storage of said physical network address,
- and in the event of the physical network address being present, the server being configured to:
- block configuration of the system of modules to deny the system of modules access to the central server, and
  - sending a notification containing an installation geolocation information item to an initial installation operator identified by an installation operator identification information item stored in association with said physical network address in the central server.

* * * * *